Nov. 29, 1949 W. DZUS 2,489,870
BONE FASTENING DEVICE
Filed March 2, 1946
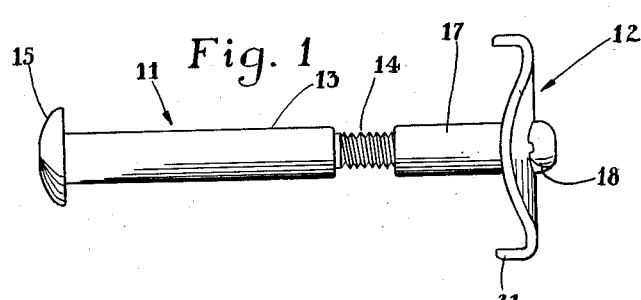
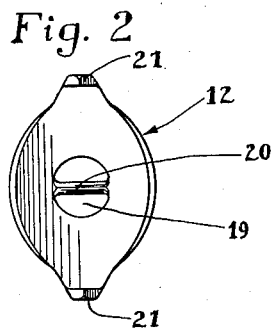
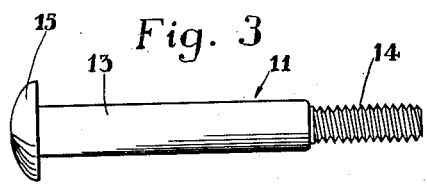
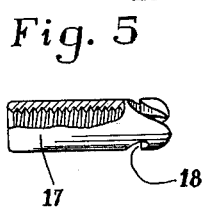
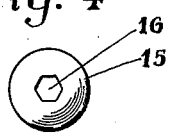
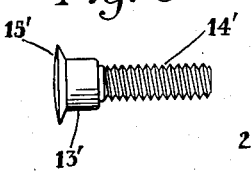
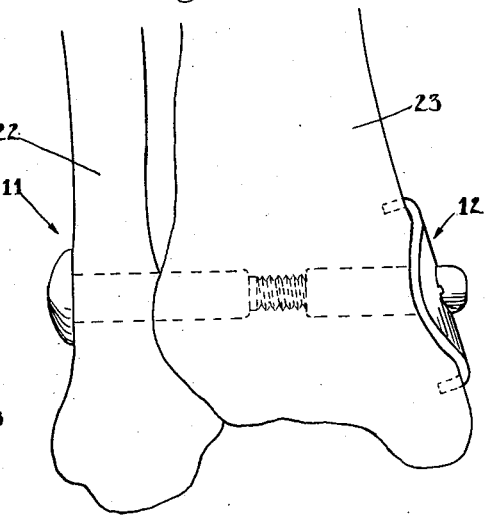
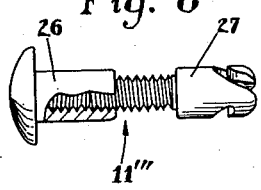
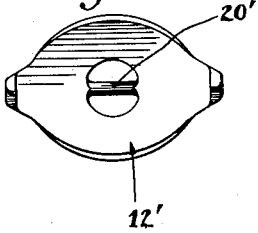
INVENTOR
William Dzus
ATTORNEY Patented Nov. 29, 1949

2,489,870

UNITED STATES PATENT OFFICE 2,489,870

BONE FASTENING DEVICE

William Dzus, West Islip, N. Y.

Application March 2, 1946, Serial No. 651,486

4 Claims. (Cl. 128—92)

This invention relates to an improved fastening device.

It is an object of the invention to provide a fastening device of the quick-operating type which is suitable for use where the thickness of the materials to be fastened cannot be accurately determined ahead of time, and in which the surface of the material is irregular and uneven and has contours therein.

A further object of the invention is the provision of a fastening device of the quick-acting type which is of non-resilient construction so that parts fastened thereby are rigidly and fixedly secured together.

A further object is the provision of an improved fastening device of the above character which is particularly suitable for use in bone surgery for retaining fractured bones, dislocated joints, spread mortises, or the like, in proper position. In this connection, my fastener has the advantage that it is easy to install; that it readily accommodates itself to the uneven surface of the bone and can be easily adjusted to the varying thicknesses thereof; and that it extends completely through the bone, and therefore, does not depend upon threaded engagement with the bone.

Among other objects is the provision of an improved fastener of the above character which is relatively inexpensive to manufacture; simple to install and operate; and which is rugged and sturdy in construction.

In the accompanying drawings:

Fig. 1 is a side view of a fastener assembly embodying my invention;

Fig. 2 is a plan view of the clip portion of the fastener assembly;

Fig. 3 is a side view of the upper part of the stud portion;

Fig. 4 is a plan view of the head of the stud portion;

Fig. 5 is a fragmentary view of the tip or locking part of the stud portion;

Fig. 6 is a side view of a modified form of head part for the stud portion;

Fig. 7 is a partially fragmentary side view of a modified type of stud portion made of three parts;

Fig. 8 is a partially fragmentary view of a further modified stud portion;

Fig. 9 is a plan view of a modified type of clip; and

Fig. 10 is a side view of a typical installation of the first form of fastener assembly showing it applied to the ankle bones to correct a spread mortise.

Referring to the first form of my invention, the fastening device comprises generally a stud 11 and a clip 12, which are interengageable by rotation of one member with respect to the other.

The stud in the first form of my invention is formed of two parts. The head part 13 is formed with a protruding threaded shank 14 at one end and a head 15 at the opposite end. The head 15 is preferably provided with some type of operating means whereby the stud may be rotated. In the illustrated embodiment, I provide a socket type of head having a hex socket as indicated at 16 in Fig. 4. The stud is also provided with a locking part 17 which is tubular in construction and internally threaded so as to be interengageable with the threaded shank 14. At the outer end of the locking part, I provide suitable locking or fastening means which are interengageable with the clip upon the rotation thereof. In the illustrated embodiment the fastening means takes the form of the conventional type of spiral cam fastening means consisting of a pair of oppositely disposed spiral cam slots 18 provided with shoulders at the inner end thereof which serve as locking detents.

The clip 12 is preferably of generally elliptical shape and the inner surface thereof is preferably transversely concave, and the outer surface transversely convex. Adjacent the center thereof, the clip is provided with an aperture 19 having a cross bar 20 extending across one diameter thereof. The cross bar is of such a size as to be engageable with the spiral slots 18 of the locking part of the stud so that when the stud is rotated in a clockwise direction, the cross bar will be drawn inwardly by the spiral slots until it is locked behind the shoulders. Rotation of the stud in a counter-clockwise direction serves to release the cross bar from engagement with the slots. So as to retain the clip firmly in position and to lock it against rotation, I preferably provide it with inwardly turned pointed prongs 21 on the opposite ends thereof.

In using my improved fastening device, the stud is first assembled by engaging the head part 13 with the locking part 17. The two parts are adjusted to the approximate required length. In this connection, the stud should preferably be adjusted so that it is slightly longer than the required length. The clip is then placed on one side of the parts to be fastened and the stud is inserted through the parts from the opposite side. The stud is then rotated to cause the spiral slots to interengage with the cross bar on the clip. Thereafter, the operator continues to rotate the head part of the stud in a clockwise direction until the length of the stud is adjusted to the thickness of the parts being fastened.

In this connection, I wish to point out that the threads on the two stud parts should be so arranged that when the stud head is rotated in a locking direction, the threads are caused to interengage and tighten, and when the head is rotated in an unlocking direction, the threads are caused to loosen. Also, the interengaging threads of the head and locking parts of the stud should fit sufficiently tightly so that normally rotation of the head part causes rotation of the locking part. However, when the locking part is held against rotation, continued rotation of the head part causes either tightening or loosening of the threads, depending upon the direction of rotation.

One typical application of the fastening device is shown in Fig. 10 where the fastener is illustrated as being used for the fixation of an ankle mortise. The patient in this case was suffering from a severe sprained ankle or a spread ankle mortise. The fastener is used to correct the condition by drilling thru fibula 22 and tibia 23. Thereafter, the clip 12 is placed over the opening on the tibia with the two prongs engaging the bone and the stud portion 11 is adjusted so as to be slightly longer than the combined thicknesses of the two bones and it is inserted thru the aperture. It is then rotated to interlock the spiral slots with the cross bar in the clip, and thereafter, the head is further rotated so as to firmly clamp the two bones together. It will be noted from Fig. 10 how the clip 12 readily accommodates itself to the angle of the external surface of the tibia.

When the fastener has been inserted and used in this fashion, it greatly shortens the period of immobilization of the patient, and it eliminates the necessity of using a cast.

For internal use the fastener should, of course, be made of a material which is neutral and unaffected by body fluids, such as American Iron and Steel Institute type 316 stainless steel, and the fastener may be left permanently in position. Under certain circumstances, of course, the surgeon may desire at a later date to remove the fastener and this, of course, may be done.

Fastener studs of different lengths may be required and for this purpose, head parts of different lengths may be provided. Thus, as shown in Fig. 6, I may provide a head part 13' of greatly reduced length, but which is otherwise similar in construction to the head part 13 and is interengageable with the locking part 17. Thus, it has a threaded shank 14' and a head 15'. The head 15' in the form of device shown in Fig. 6, has a tapered under surface which has certain advantages where the head is to be applied to a surface having irregular contours.

In Fig. 7, I have shown a modified type of stud 11'' composed of three parts. Thus, it has a locking part 17 similar to that provided in the first form of my invention, a tubular internally threaded head part 24, and an intermediate connecting part 25 having threaded shanks projecting from the opposite ends thereof and engageable with the head and operating parts. By rotating the head part 24 in a clockwise direction, relative to the operating part, the threads are tightened thereby shortening the length of the stud, while rotation in the opposite direction loosens the threads and increases the length of the stud.

In Fig. 8, I have shown a further modified type of stud indicated as 11'''. In this form of my stud, I provide a tubular internally threaded head part 26 and a locking part 27 having a threaded projecting shank engageable with the head part upon the rotation of head part in a clockwise direction. The locking part has spiral cam locking slots similar to that shown in the first form of my invention.

The exact arrangement of the cross bar 20 in the clip 12 may be varied considerably. Thus, in Fig. 9, I have shown a clip 12' similar in construction to the first form of the clip with the exception that the cross bar 20' extends longitudinally rather than transversely.

While I have illustrated my invention as being used for the correction of a spread ankle mortise, it will be appreciated that it has many other uses and applications. Thus, it may be used for correcting bone fractures, dislocations, and the like, and may be used for many non-surgical purposes where it is desired to rigidly fasten two parts together.

Modifications may, of course, be made in the illustrated and described embodiments of my invention.

I claim:

1. In a fastening device a clip comprising a generally oval shape plate which is transversely concave on the inner surface thereof, said clip being provided with inwardly projecting prongs on the opposite ends thereof, and with a centrally positioned aperture having locking means associated therewith.

2. A fastening device for use in orthopedic surgery comprising a clip consisting of a plate having an aperture therein with locking means associated therewith, and a stud having locking means adjacent one end which is interengageable with the locking means of the clip when the end of the stud is inserted in the aperture, the diameter of the aperture being greater than the diameter of said end of the stud to permit tilting of the clip with respect to the stud.

3. A fastening device for use in orthopedic surgery comprising a clip consisting of a plate having an aperture therein with locking means associated therewith, a stud having a head part and a locking part having threaded connecting means, the locking part having locking means adjacent one end thereof which is interengageable with the locking means of the clip when the end of the locking part is inserted in the aperture and rotated in one direction, the threaded connecting means being arranged so that it is tightened when the head part is rotated in a direction to cause the locking means to interengage with the clip and the diameter of the aperture in the clip being greater than the diameter of the locking part so as to permit tilting of the clip with respect to the stud.

4. A fastening device for use in orthopedic surgery comprising a clip consisting of a plate having an aperture therein with locking means associated therewith, a stud having a head part and a locking part having threaded connecting means, the locking part having locking means adjacent one end thereof which is interengageable with the locking means of the clip when the end of the locking part is inserted in the aperture and rotated in one direction, the threaded connecting means being arranged so that it is tightened when the head part is rotated in a direction to cause the locking means to interengage with the clip.

WILLIAM DZUS.

REFERENCES CITED

The following references are of record in the file of this patent:

UNITED STATES PATENTS

| Number | Name | Date |
| --- | --- | --- |
| 945,737 | Anderson | Jan. 11, 1910 |
| 1,841,575 | Dorsch | Jan. 19, 1932 |
| 2,389,184 | Cooke | Nov. 20, 1945 |